United States Patent

Tisi et al.

[15] 3,654,564

[45] Apr. 4, 1972

[54] RECEIVER INCLUDING AN N-PHASE DEMODULATOR

[72] Inventors: Feliz Daniel Tisi, Zuerich, Switzerland; Frank De Jager, Emmasingel, Eindhoven, Netherlands

[73] Assignee: U.S. Philips Corporation, New York, N.Y.

[22] Filed: June 4, 1970

[21] Appl. No.: 43,341

[30] Foreign Application Priority Data

June 7, 1969 Netherlands..........................6908714

[52] U.S. Cl...............................329/122, 325/320, 325/346, 328/133, 328/151, 329/50, 329/112, 329/104

[51] Int. Cl...........................................................H03d 3/18

[58] Field of Search....................329/51, 112, 122, 104, 110; 328/133, 151; 178/66; 325/30, 320, 346, 349

[56] References Cited

UNITED STATES PATENTS

| | | | |
|---|---|---|---|
| 2,976,363 | 3/1961 | Barton | 329/50 X |
| 3,430,143 | 2/1969 | Walker et al. | 325/320 X |
| 3,456,194 | 7/1969 | Walker et al. | 325/320 |
| 3,479,598 | 11/1969 | Weller | 329/104 X |

*Primary Examiner*—Alfred L. Brody
*Attorney*—Frank R. Trifari

[57] ABSTRACT

The invention relates to a receiver for the reception of information pulse signals transmitted by means of *n*-phase modulation wherein the original information pulses coincide with different pulses from a series of equidistant clock pulses, the receiver including an *n*-phase demodulator which is provided with a plurality of parallel arranged synchronous demodulators which are fed by carriers having mutually different reference phases originating from a local carrier generator which is stabilised in phase on the carrier associated with the received signals, signal channels being connected to the outputs of the *n*-phase demodulator including sampling circuits controlled by a local clock pulse generator the output signal of which sampling circuits characterizes the phase of the received carrier relative to the relevant reference phase of the local carrier at the instants of the local clock pulses, the receiver furthermore being provided with combination circuits connected to the sampling circuits, which combination circuits characterize each of the *n*-possible phase sectors of the transmitted signals in a phase diagram by means of a separate combination of the outputs of the signal channels.

Such receivers are advantageously used in transmission systems which transmit an optimum quantity of information in the available frequency band. To stabilise the local carrier generator on the carrier at the transmitter end, the carrier frequency is transmitted, for example, in conventional manner from the transmitter to the receiver through a separate transmission path or with the aid of a pilot signal added to the information pulse signals to be transmitted.

5 Claims, 3 Drawing Figures

INVENTORS
FELIX D.TISI
FRANK DE JAGER
BY
Frank R. Trifari
AGENT

| | 23 | 24 | 28 |
|---|---|---|---|
| (1) | 1 | 1 | 1 |
| (2) | 1 | 1 | 0 |
| (3) | 0 | 1 | 0 |
| (4) | 0 | 1 | 1 |
| (5) | 0 | 0 | 1 |
| (6) | 0 | 0 | 0 |
| (7) | 1 | 0 | 0 |
| (8) | 1 | 0 | 1 |

INVENTORS
FELIX D.TISI
FRANK DE JAGER
BY
AGENT

RECEIVER INCLUDING AN N-PHASE DEMODULATOR

The object of the present invention is to provide a different conception of a receiver of the kind described in the preamble in which the local carrier frequency can be derived in its proper phase from the received information pulse signals themselves with the aid of digital techniques so that the receiver may for the greater part be realized as an integrated circuit.

The receiver according to the invention is characterized in that for stabilizing the local carrier generator, the $n$-phase demodulator forms part of a $2n$-phase demodulator, in which in addition to said signal channels for $n$-phase demodulation also auxiliary channels are connected to the outputs of the $2n$-phase demodulator, which auxiliary channels are provided with sampling circuits controlled by the local clock pulse generator, the output signal of said sampling circuits characterizing the phase of the received carrier relative to an additional reference phase of the local carrier within said phase sectors for $n$-phase demodulation at the instants of the local clock pulses, and the receiver furthermore being provided with a plurality of selection gates, in each case the combination of signal channels characterizing a given phase sector as well as the auxiliary channel characterizing the additional reference phase within this phase sector being connected to a separate selection gate, the outputs of the selection gates being connected to a combination circuit which is connected to a phase stabilization circuit of the local carrier generator.

In order that the invention may be readily carried into effect, a few embodiments thereof will now be described in detail by way of example with reference to the accompanying diagrammatic drawings, in which:

FIG. 1 shows a receiver according to the invention, while

Figure 1:
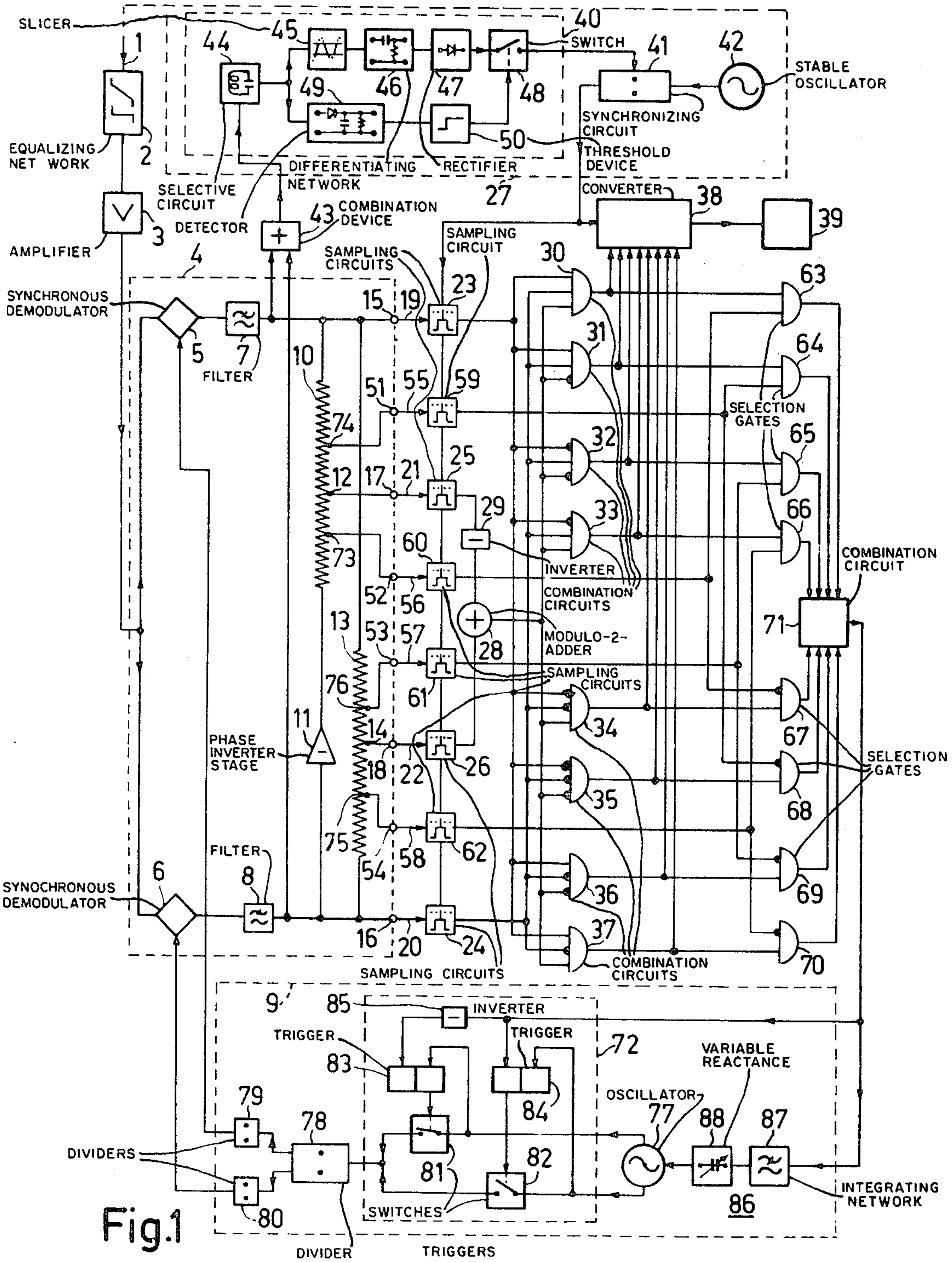

FIG. 1 shows a receiver according to the invention which is adapted for the reception of synchronous information pulse signals transmitted with the aid of eight phase differential phase modulation, which information pulse signals differentially phase-modulate a carrier oscillation having a frequency $f_c$ of, for example, 1.7 kHz. In this case, the transmitted information pulse signals are derived from binary information pulses which coincide with different pulses from a series of equidistant clock pulses having a clock frequency $3f_b$ of, for example, 2.4 kHz.

In the receiver shown the phase-modulated signal derived from the transmission path 1 and located in a transmission band of 1.2 – 2.2 kHz is applied through an equalizing network 2 for equalizing said transmission band an input amplifier 3 to an eight-phase demodulator 4.

The eight-phase demodulator 4 of FIG. 1 is provided with two parallel synchronous demodulators 5 and 6 followed by lowpass filters 7, 8 having a cut-off frequency of, for example, 0.5 kHz. The synchronous demodulators 5,6 are fed by carriers having a reference phase of 0° and +90°, respectively, which originate from a local carrier generator 9 which is stabilized on the phase of the carrier frequency $f_c$ associated with the received signals, the two desired demodulation results being produced at the outputs of the lowpass filters 7, 8. In the eight-phase demodulator 4 shown, the results of synchronous demodulation by means of carriers having a reference phase of +45° and −45°, respectively, are required too; they are obtained in a simple manner with the aid of resistors provided between the outputs of lowpass filters 7, 8. Particularly, the demodulation result for the reference phase of +45° is obtained with the aid of a resistor 10 to which the output of lowpass filter 7 is directly connected and to which the output of lowpass filter 8 is connected through a phase inverter stage 11, the resistor 10 being tapped exactly in the center 12 and the desired result occurring at this central tapping. Likewise, the demodulation result for the reference phase of −45° is obtained with the aid of a resistor 13 connected between the outputs of the lowpass filters 7,8 and likewise tapped exactly in the center, which resistor provides the desired result at this central tapping 14. The demodulation results for the reference phases of 0°, +90°, +45° and −45° then appear at the outputs 15, 16, 17 and 18, respectively, of the eight-phase demodulator 4, which demodulation results are constituted by quaternary information pulse signals limited in bandwidth, the original information pulses of which occur in the rhythm of a clock frequency $f_b = 0.8$ kHz.

The recovery of the original binary information pulse signals at a transmission speed of 2,400 Baud in the receiver of FIG. 1 will now be described with reference to a phase diagram of FIG. 2 and an associated Table.

Figure 2:
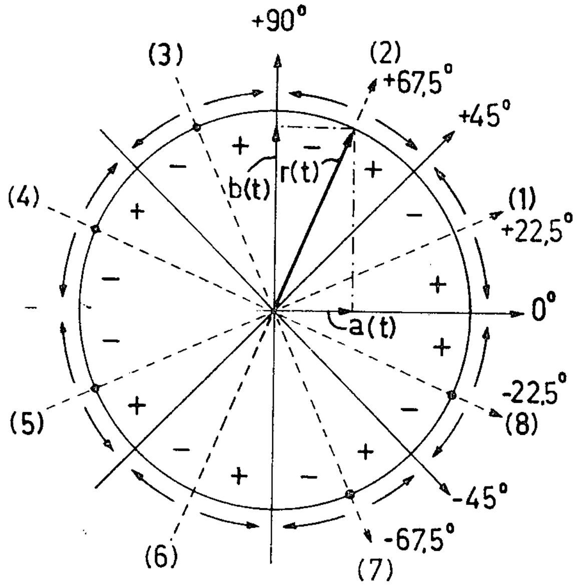
FIG. 2 shows a phase diagram and a table.

The phase diagram of FIG. 2 shows eight successive sectors of 45°, octants, the differentially phase-modulated signal derived from the transmission path 1 and denoted by $r(t)$ being located in the center of one of the octants at the instants determined by the clock pulses of the frequency $f_b = 0.8$ kHz when the local carrier generator 9 is stabilized in phase. Due to the synchronous demodulation by means of the local carriers having reference phases of 0° and +90° the demodulation results $a(t)$ and $b(t)$ are obtained at the outputs 15, 16, respectively, which results are indicated in FIG. 2 as projections of the phase-modulated signal $r(t)$ of that instant on the local carriers having reference phases 0° and +90°, respectively. With the aid of these signals $a(t)$ and $b(t)$ and the associated signals $a(t) - b(t)$ and $a(t) + b(t)$ appearing at the outputs 15, 16, 17, 18, respectively, of the phase demodulator 4 it is now determined in which of the octants the phase-modulated signal $r(t)$ is located at the instants of the local clock pulses of clock frequency $f_b$.

To this end the outputs 15, 16, 17, 18 are connected to signal channels 19, 20, 21, 22, respectively, each provided with sampling circuits 23, 24, 25, 26 which are controlled by a local clock pulse generator 27 which is accurately phase-stabilized on the clock frequency $f_b$ at the transmitter end. The sampling circuits 23, 24, 25, and 26, which are formed as sample-and-hold circuits in the receiver shown determine under the control of the local clock pulses whether the respective signals $a(t)$, $b(t)$ $a(t) - b(t)$ and $a(t) + b(t)$ are either positive or negative and thereby characterize the phase of the received carrier at the local clock instants relative to the relevant reference phase of the local carrier. A pulse having a binary value of 1 or 0 dependent on whether the signal applied to the sampling circuits 23–26 is either positive or negative now occurs at the output of the sampling circuits 23-26.

The polarity of the signals $a(t)$ and $b(t)$ is directly utilized while the sampled signals $a(t) - b(t)$ and $a(t) + b(t)$ are applied to a modulo-2-adder 28, an inverter 29 preceding one of the inputs of the modulo-2-adder 28 so that a pulse having a binary value of 1 occurs at the output of the modulo-2-adder 28 when the signals $a(t) - b(t)$ and $a(t) + b(t)$ simultaneously have the same polarity, and a pulse of the binary value 0 when the polarities of these signals are opposite.

The relationship between the octant of the phase diagram of FIG. 2 in which the phase-modulated signal $r(t)$ is present and the polarity of the signals $a(t)$, $b(t)$, $a(t) - b(t)$ and $a(t) + b(t)$ is shown in a table in FIG. 2. The first column of the table indicates the number of the octant in the phase diagram, while the second, third and fourth columns indicate the binary values of the pulses at the outputs of the sampling circuits 23, 24 and the modulo-2-adder 28, respectively.

To the sampling circuits 23–26 there are connected combination circuits 30, 31, 32, 33, 34, 35, 36, 37 which characterize each octant in the phase diagram of FIG. 2 by a separate combination of the pulses at the output of the signal channels 19 – 22. In the receiver shown, these combination circuits 30 – 37 are formed, for example, with AND-gates each having three inputs which are connected to the outputs of the sampling circuits 23, 24 and the modulo-2-adder 28, respectively, the dots on the AND-gates being the usual notation for an inverter at the input. The pulses are then directly applied to the input of the AND-gates when they have the binary value 1 in the relevant combination, or through an inverter preceding the input of the AND-gates when they have the binary value 0 in the relevant combination. When the phase-modulated signal is in a certain octant of the phase diagram at a given local clock instant, a pulse of the binary value 1 occurs only at the output of the combination circuit corresponding to this octant, while all other combination circuits provide a pulse of the binary value 0. Thus, for example, a pulse of the binary value 1 occurs at the output of AND-gate 31 when the phase-modulated signal $r(t)$ is located in octant (2) of the phase diagram of FIG. 2 which in accordance with the table is characterized by the binary combination 110 so that the pulses from the sampling circuits 23, 24 must be directly applied to the AND-gate 31 and those from modulo-2-adder 28 must be applied through an inverter to the AND-gate 31.

The obtained data regarding the octant in which the phase-modulated signal is present at a certain clock instant are now utilized for recovering the original information pulse signals at transmission speed of 2,400 Baud the binary information pulses of which have differentially phase-modulated the carrier at the transmitter end with phase changes having a magnitude of $$\phi = n \times 45° \text{ with } n = 0, 1, 2, ....., 7$$

between successive instants of the clock pulses of frequency $f_b$ = 0.8 kHz.

To this end the outputs of the AND-gates 30 – 37 are connected to a signal converter 38 in a cycle corresponding to the succession of the octants in the phase diagram. This signal converter 38 determines in known manner the number of octants which has been passed by the phase-modulated signal between successive instants of the local clock pulses of frequency $f_b$ and derives from this number, which indicates the magnitude of the phase change of the carrier, the associated combination of three successive information pulses in the original information pulse signal whereafter the recovered information pulses are passed on to a user 39 in the rhythm of the three-fold clock frequency $3f_b$ = 2.4 kHz.

If, for example, a pulse of the binary value 1 appears at a certain clock instant at the output of AND-gate 31 and a pulse of the binary value 1 appears at the output of AND-gate 34 at the next clock instant, it then follows that the phase of the received carrier of octant (2) in the phase diagram has changed to octant (5) and the phase change $\phi$ at the transmitter end has thus amounted to 3 × 45°.

The magnitude of the phase changes is determined by the signal converter 38, for example, by counting with the aid of a binary counter over how many outputs of the AND-gates 30 – 37 connected in a cyclic sequence the binary value 1 has changed between successive clock instants. In case of suitable choice of the phase changes $\phi$ for the modulation at the transmitter end the final position of the binary counter directly indicates the associated combination of three successive information pulses in the original binary information pulse signals so that this combination is obtained in series form by reading out the binary counter in parallel and by subsequently using parallel-series conversion.

Since differential phase modulation has taken place at the transmitter end at phase changes $\phi$ having a magnitude of $\phi = n \times 45°$ with n = 0, 1, 2...., 7, the local carrier at the receiver end need not absolutely correspond in phase to the carrier at the transmitter end, but a phase difference of ± 45°, ± 90°, ± 135° or ± 180° may be present between the two carriers.

On the other hand an accurate phase synchronization of the local clock pulse generator 27 is necessary. This may be effected by transmitting the clock-frequency $f_b$ with the aid of a pilot signal or in a different manner, for example, over a separate transmission path, from the transmitter to the receiver and by recovering this clock frequency with the aid of a clock frequency extractor 40, for example, in the form of a pilot filter and by subsequently applying the recovered clock frequency to a phase synchronizing circuit 41 of the local clock pulse generator 27. In the receiver shown the local clock pulse generator 27 is formed as a free-running generator in the form of a stable oscillator 42 of high frequency, for example, a frequency $64 f_b$ = 51.2 kHz followed by a phase synchronizing circuit 41 formed as a digital divider having a division factor of 64, the phase synchronization being brought about by applying pulses derived from the recovered clock frequency $f_b$ as reset pulses to the divider so as to return this divider every time to its initial position.

In the receiver shown the clock frequency is advantageously recovered with reliable phase from the received information pulses themselves in a manner which has extensively been described in prior patent application Ser. No. 863,126 filed Oct. 2, 1969. To this end the information pulse signals $a(t)$ and $b(t)$ derived from the lowpass filters 7, 8 are both applied in the receiver according to FIG. 1 through a linear combination device 43 to a selective circuit 44 in corporated in the clock frequency extractor 40 which selective circuit is tuned to half the clock frequency $f_b/2$. The output of this selective circuit 44 is connected to a circuit functioning as a frequency doubler which in FIG. 1 is constituted by a slicer 45 the slicing levels of which have been set on either side of the zero level, followed by a differentiating network 46 for the sliced selected signal of half the frequency $f_b/2$ and a full-wave rectifier 47 which is connected to a normally open electronic switch 48. This electronic switch 48 is controlled by a control circuit which in FIG. 1 is constituted by an amplitude detector 49 for the selected signal of half the clock frequency $f_b/2$ followed by a threshold device 50 which upon exceeding its threshold level provides a control signal for closing the electronic switch 48. The series of pulses occurring at the input of the electronic switch 48 and coinciding with the zero crossings of the signal of half the clock frequency $f_b/2$ selected in the selective circuit 44 is only applied to the phase synchronizing circuit 41 if the amplitude of the selected signal is sufficiently high so that a particularly reliable and accurate phase synchronization of the local clock pulse generator 27 is achieved completely avoiding adverse influence by the information pulse signals as has extensively been described in said patent application.

In order to stabilize the local carrier generator 9 according to the invention accurately in phase in the receiver described so far, the eight-phase demodulator 4 forms part of a phase demodulator for 16-phase signals wherein in addition to the mentioned signal channels 19–22 for eight-phase demodulation connected to the outputs 15– 18 also auxiliary channels 55, 56, 57, 58 are connected to outputs 51, 52, 53, 54 of the 16-phase demodulator 4, which auxiliary channels are provided with sampling circuits 59, 60, 61, 62 controlled by the local clock pulse generator 27, the output signal of said sampler circuits characterizing the phase of the received carrier relative to an additional reference phase of the local carrier within the said phase sectors of 45° for eight-phase demodulation at the instants of the local clock pulses. Furthermore, the receiver according to the invention is provided with a plurality of selection gates, 63, 64, 65, 66, 67, 68, 69, 70 wherein in each case the combination of signal channels 19 – 22 which characterizes a certain phase sector of 45° as well as the auxiliary channel 55 – 58 which characterizes the additional reference phase within this phase sector of 45° are connected to a selection gate 63 – 70, the outputs of the selection gates 63 – 70 being connected to a combination circuit 71 which is connected to a phase stabilization circuit 72 of the local carrier generator 9.

In the embodiment shown the 16-phase demodulator is obtained by a simple extension of the eight-phase demodulator 4 already described. The demodulation results for the additional reference phases of ± 22.5° and ± 67.5° are obtained in the receiver according to FIG. 1 by providing each resistor 10, 13 with two additional tappings. Particularly, the demodulation results for the additional reference phases of ± 22.5° and +67.5° occur at a tapping 73 and a tapping 74, respectively, of resistor 10 and for the additional reference phases of −22.5° and −67.5° they occur at tapping 75 and tapping 76, respectively, of resistor 13.

If for a certain tapping the resistor between the output of lowpass filter 7 and the relevant tapping has the value $R_a$, and the resistor between the relevant tapping and the output of lowpass filter 8 has the value of $R_b$ and if each of the resistors 10 and 13 has the value $R$, a signal $s(t)$ occurs at the relevant tapping which signal is formed from the signals $a(t$and $b(t)$ in accordance with the relation $$s(t) = (1/R)\cdot [R_b\cdot a(t) - R_a\cdot b(t)]$$

for resistor 10 and in accordance with the relation $$s(t) = (1/R)\cdot [R_b\cdot a(t) + R_a\cdot b(t)]$$

for resistor 13. The ratio $R_a : R_b$ is chosen to be such that $s(t)$ for a certain tapping reverses its polarity just when the phase of the received carrier passes the additional reference phase of the local carrier associated with the tapping. For the additional reference phase of +22.5° associated with tapping 73 there applies that, for example, $$R_a : R_b = \cos 22.5° : \sin 22.5°$$

from which with $R_a + R_b = R$ follows that:

$$R_a = 0.707\ R \qquad R_b = 0.293\ R.$$

The relationship shown in the table below then applies for the reference phases of ± 22.5° and ± 67.5°.

| Tapping | Reference Phase | $R_a/R$ | $R_b/R$ |
|---|---|---|---|
| 73 | + 22.5° | 0.707 | 0.293 |
| 74 | + 67.5° | 0.293 | 0.707 |
| 75 | − 22.5° | 0.707 | 0.293 |
| 76 | − 67.5° | 0.293 | 0.707 |

The sampling circuits 59 – 62 which in the receiver shown are likewise formed as sample-and-hold circuits determine under the control of the local clock pulses whether the signals $s(t)$ occurring at the outputs 51 – 54 of the 16-phase demodulator 4 are either positive or negative and thereby characterize the phase of the received carrier at the local clock instants relative to the derived additional reference phase of the local carrier within the octants shown in FIG. 2 for eight-phase demodulation. A pulse having a binary value of 1 or 0 dependent on whether the derived signal $s(t)$ is either positive or negative then occurs at the output of the sampling circuits 59 – 62.

The phase diagram of FIG. 2 shows that each additional reference phase divides the relevant octant into two equal sectors of 22.5°, the signal $s(t)$ being positive for a phase-modulated signal $r(t$which is present at a given clock instant in one sector within this octant, and being negative when this phase-modulated signal $r(t)$ is then present in the other sector within this octant. In FIG. 2 the polarities of the respective signals $s(t)$ have been indicated for the different octants.

As already described in the foregoing, the phase-modulated signal $r(t)$ is located exactly in the center of the octants at the clock instants when the local carrier generator 9 is stabilized in phase. However, when the phase of the local carrier generator 9 deviates, the phase-modulated signal $r(t)$ is present in one of the two sectors into which each octant is divided and the phase of the local carrier generator 9 is to be corrected. If the phase-modulated signal $r(t)$ is present, for example, in the sector of 0° – 22.5° at a given clock instant, it follows that the local carrier is leading in phase and must be corrected in a negative sense, or in other words, the phase correction must have a negative polarity. Conversely, for a phase-modulated signal $r(t)$ in the sector of 22.5° – 45° the local carrier is lagging in phase and a phase correction must be effected in a positive sense. In FIG. 2, the sense in which the phase of the local carrier is to be corrected is indicated by an arrow for each sector of 22.5°.

In the receiver shown the polarity of the respective signals $s(t)$ at the outputs 51 – 54 of the 16-phase demodulator 4 is utilized to obtain an indication regarding the polarity of the phase corrections. In that case it is sufficient to determine the sector within each octant which gives rise to a phase correction of a certain polarity, for example, the negative polarity in the receiver according to FIG. 1. To this end the output of the associated combination circuit 30 – 37 and the output of the associated auxiliary channel 55 – 58 are connected to a separate selection gate 63 – 70 for each octant. In FIG. 1 the selection gates 63 – 70 are formed as AND-gates having two inputs, the pulses of binary value 1 from the combination circuits 30 – 37 being always applied directly to one input, while the pulses from the auxiliary channels 55 – 58 are applied directly to the second input if they have a binary value 1 for the relevant sector of negative phase correction, or through an inverter preceding this second input if they have a binary value 0 for the relevant sector of negative phase correction. In this manner, it is achieved that a pulse of the binary value 1 only occurs at the output of a selection gate associated with a certain octant when the phase-modulated signal $r(t)$ is present in the sector of negative phase correction within this octant at a given local clock instant. Thus, for example, a pulse of the binary value 1 occurs at the output of selection gate 63 when the phase-modulated signal $r(t)$ is present in the sector of 0° – 22.5° within octant (1) of the phase diagram of FIG. 2, because then a pulse of the binary value 1 appears both at the output of combination circuit 30 and at the output of auxiliary channel 56. Likewise a pulse of the binary value 1 occurs, for example, at the output of selection gate 67 which is provided with an inverter at the second input when the phase-modulated signal $r(t)$ is present in the sector of 180° – 202.5° within octant (5) of the phase diagram as then a pulse of the binary value 1 appears at the output of combination circuit 34, but a pulse of the binary value 0 appears at the output of auxiliary channel 56. In the receiver according to FIG. 1 the output pulses from the selection gates 63 – 70 are applied through the combination circuit 71 constituted by an OR-gate to the phase stabilization circuit 72 of the local carrier generator 9.

The local carrier generator 9 shown in FIG. 1 is constituted as a free-running generator in the form of a stable oscillator 77 of high frequency, for example, a frequency $128f_c$ = 217.6 kHz. which is followed by a digital divider 78 having a division factor of 64 which provides two carriers mutually shifted 180° in phase and having a frequency of $2f_c$, the local carriers having a reference phase of 0° and +90° being obtained with the aid of two dividers 79 and 80, respectively.

Furthermore, the phase stabilization circuit 72 is formed in known manner, the oscillator 77 providing two pulse series mutually shifted 180° in phase which series are both applied through electronic switches 81, 82 to be digital divider 78. The electronic switch 81 is normally closed and the electronic switch 82 is normally open, both switches 81, 82 being controlled by bistable triggers 83 and 84, respectively, to which the output pulses from OR-gate 71 are applied as set pulses through an inverter 85 and directly, respectively, while the series of pulses originating from oscillator 77 and applied to the switches 81, 82 are also applied as reset pulses to the bistable triggers 83, 84. If, for example, a pulse of the binary value 1 occurs at the output of OR-gate 71, the normally closed switch 81 is opened through inverter 85 and bistable trigger 83 and is subsequently closed by the next pulse from oscillator 77 so that in the series of pulses of frequency $128f_c$ exactly one pulse less is applied to the digital divider 78 and consequently the local carriers of frequency $f_c$ at the output of the dividers 79, 80 are retarded in phase by an amount of 360° /128. Conversely, in case of a pulse of the binary value 0 at the output of OR-gate 71, the normally open switch 82 is closed via bistable trigger 84 and is opened again by the next pulse from oscillator 77 so that exactly one pulse more is applied to the digital divider 78 resulting in a positive phase correction of the local carriers by the same amount of 360°/128. Thus, the magnitude of the phase correction is always constant.

The phase stabilization of the local carrier generator 9 in the receiver according to the invention will be described with reference to the time diagrams of FIG. 3.

Figure 3:
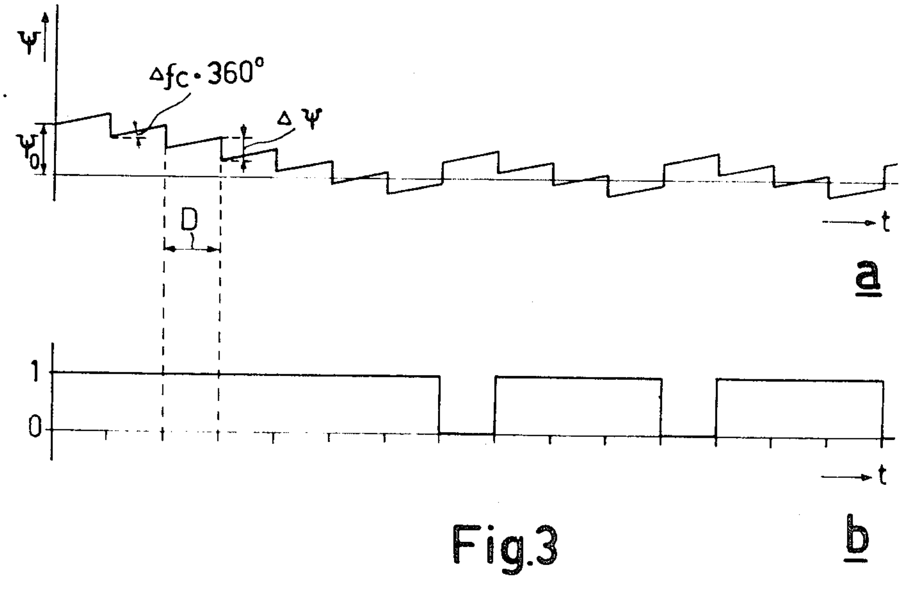
FIG. 3 shows several time diagrams for the purpose of explaining the receiver according to FIG. 1.

FIG. 3 shows at $a$ the variation of the phase deviation $\psi$ of the local carrier generator 9 relative to the carrier at the transmitter end, the initial phase deviation being $\psi_o$ and the local carrier having a frequency deviation of $+ \Delta f_c$, while the pulses at the output of OR-gate 71 are shown at $b$ which in case of such a variation occur at the instants of the local clock pulses having a repetition period of $D = 1/f_b$.

Whenever the phase deviation $\psi$ is positive at a clock instant, that is to say, whenever a negative phase correction is to be performed, the OR-gate 71 provides a pulse of binary value 1 which suppresses one pulse by means of the switch 81 in the series of input pulses from the divider 78 so that the phase deviation $\psi$ of the local carrier at the output of the carrier generator 9 is reduced by a fixed amount $\Delta \psi = 360°/m$, where $m$ is the division factor of the series-arranged dividers 78, 79 and 78, 80, respectively, which division factor is 128 in this embodiment. During the next period having a magnitude of D, the phase deviation $\psi$ caused by the frequency deviation $+\Delta f_c$ increases linearly by an amount of $(\Delta f_c \cdot 360°) \cdot D$. Dependent on whether the phase deviation $\psi$ is positive or negative at the next clock instant, a pulse is suppressed by means of one of the switches 81, 82 or a pulse is added to the series of input pulses from the divider 78. In this manner a local carrier is obtained the phase of which oscillates in a sawtooth manner around the phase of the carrier at the transmitter end after reaching the stabilized condition, the rhythm of the oscillation being determined by the clock frequency $f_b$.

The described circuit for the purpose of stabilizing the local carrier generator 9 thus tends to render the phase deviation $\psi$ zero so that the phase of the local carrier constitutes a quantized approximation of the phase of the carrier at the transmitter end. Since exclusively the polarity of the phase deviation $\psi$ and not its magnitude is utilized for determining the phase corrections, the obtained phase stabilization is particularly sensitive and reliable in operation, while in addition the accuracy of approximation of the phase of the carrier at the transmitter end can be improved in a simple manner.

In fact, if the number of positive phase corrections is compared with the number of negative phase corrections over a comparatively long period, the difference constitutes an indication for the frequency deviation $\Delta f_c$ of the local carrier generator 9. For example, if the series of pulses shown at $b$ in FIG. 3 at the output of OR-gate 71 is considered, it appears that over a comparatively long period the number of negative phase corrections (pulses of binary value 1) in the stabilized condition is higher than the number of positive phase corrections (pulses of binary value 0) from which follows that the carrier generator 9 has a positive frequency deviation $+\Delta f_c$. In the receiver according to FIG. 1, this indication is utilized to reduce the frequency deviation $\Delta f_c$ with the aid of a frequency correction circuit 86. To this end, the frequency correction circuit 86 is provided with an integrating network 87 connected to the OR-gate 71 and formed, for example, by a smoothing filter having a time constant of 10D, the output signal of which filter is applied as a control signal to a frequency determining member 88 of the oscillator 77, which member is formed, for example, as a variable reactance. In this manner the phase deviation $\psi$, being already small in the stabilized condition, is still further reduced so that a more accurate approximation of the carrier phase at the transmitter end is obtained.

In the foregoing it has already been described in what manner a local clock pulse generator 27 is used in obtaining the phase stabilization of the local carrier generator 9. This clock pulse generator is accurately synchronized in phase with the aid of the clock frequency $f_b$ recovered in its proper phase from the information pulse signals themselves, adverse influence by the information pulses on this phase synchronization being completely avoided. In addition the described phase synchronization of the local clock pulse generator 27 is entirely independent of the phase deviation $\psi$ of the local carrier generator 9, as has been described in the previously mentioned patent application. As a result an unwanted retroaction of the phase deviation $\psi$ through the local clock pulse generator 27 on the phase stabilization of the local carrier generator 9 is completely avoided in the receiver described and a reliable phase stabilization is obtained.

The use of the steps described thus results in a receiver which is reliable in operation and which, due to its simple structure with the aid of digital techniques, may for the greater part be formed as an integrated semiconductor circuit, both the local carrier frequency and the local clock frequency corresponding accurately and reliably in phase with the carrier frequency and the clock frequency, respectively, at the transmitter end.

It is to be noted that many other embodiments of the receiver according to the invention are possible. Thus, for example, the 16-phase demodulator 4 may alternatively be formed with eight synchronous demodulators arranged in parallel which are each fed at the required reference phase by a separate carrier, while the combination circuits 30 – 37, the selection gates 63 – 70 and the combination circuit 71 can be formed in several ways with logic circuits or equivalent circuits in analog techniques. Likewise, the actual phase stabilization circuit 72 can be formed in analog techniques, for example, by applying the output voltage of the combination circuit 71 to a smoothing filter having a time constant in the order of D, the output voltage of which filter is directly applied to a voltage-controlled oscillator 77. The receiver shown in FIG. 1 is, however, preferred by reason of its simple structure whereby digital techniques are used which ensure a sensitive and reliable phase stabilization of the local carrier generator 9.

Finally it is to be noted that generators of the controlled type may be utilized instead of local carrier generators 9 and a local clock pulse generator 27 of the free-running type such as an oscillator, the clock frequency $f_b$ or the carrier frequency $f_c$ being derived from a number of control frequencies. For example, the local clock pulses and the local carrier may be derived from pilot signals which are transmitted outside the band of 1.2 – 2.2 kHz intended for the information proper in that portion of the transmission band wherein the phase characteristic already greatly deviates from its desired linear curve. As regards their frequency, the local clock pulses and the local carrier are then recovered by mixing the selected pilot signals and by selecting the resultant sum and difference frequencies which by means of frequency multipliers are transposed to the said values of $128 f_c$ and $64 f_b$. The frequencies thus obtained are then utilized in the same manner as those in the receiver according to FIG. 1 to recover the clock pulses of frequency $f_b$ and carrier of frequency $f_c$ with the aid of divider stages and, as regards their phase, to cause them to correspond to the clock pulses and the carrier at the transmitter end with the aid of the synchronizing circuit and stabilization circuit shown in FIG. 1.

What is claimed is:

1. A receiver for the reception of a signal comprising a received carrier signal having information pulse signals $n$-phase modulated thereon, said information pulses coinciding with different pulses of a series from a pulse generator having a fixed pulse repetition rate, said receiver comprising a local carrier signal generator comprising a phase stabilization circuit, means to produce first and second groups of carrier signals from said local carrier signal generator, said carrier signals in said first group having mutually different reference phases, said carrier signals in said second group having mutually different reference phases, a $2n$-phase demodulator comprising an $n$-phase demodulator having a plurality of output means and comprising a plurality of parallel arranged synchronous demodulators which are fed by said first group of carrier signals, a local clock pulse generator for producing clock pulses, a first group of signal channels connected to the output means of said first $n$-phase demodulator, said first group of signal channels comprising a first group of sampling circuits having a first group of output signals, said first group of output signals having a first group of relative phases corresponding to the relative phases of said received carrier signal with respect to said first group of carrier signals at instants of the local clock pulses, a first group of combination circuits connected to said first group of sampling circuits, said combination circuits combining the output signals from said first group of signal channels to produce signals corresponding to the $n$-possible phase sectors of the received carrier signal, means to couple said second group of carrier signals to said 2$n$-phase demodulator, a second group of signal channels connected to the output means of said 2$n$-phase demodulator, said second group of signal channels comprising a second group of sampling circuits controlled by said local clock pulse generator, said second group of sampling circuits having a second group of output signals, said second group of output signals having a second group of relative phases corresponding to the relative phases of said received carrier signal with respect to said second group of carrier signals at instants of the local clock pulses, said second group of relative phases lying within the phase sectors corresponding to said first group of relative phases, a plurality of selection gates, each selection gate having an input from one of said first group of combination circuits and one of said second group of sampling circuits and having an output signal within one of the phase sectors, a combination circuit connected to the output means of each of said selection gates, and means to connect the output signal of said combination circuit to the phase stabilization circuit of said local carrier generator.

2. A receiver as claimed in claim 1, further comprising means to derive a multi-level information signal from said 2$n$-phase demodulator, a selective circuit tuned to half the frequency of the local clock pulse generator, means to couple said selective circuit to said means to derive a multi-level information signal, a frequency doubler comprising a non-linear circuit, means to couple said frequency doubler to said selective circuit, a phase synchronizing circuit in said local pulse generator, means to couple said non-linear circuit to said phase synchronizing circuit comprising a normally open switch, and a control circuit comprising a threshold device coupled to said selective circuit, said control circuit supplying a control signal for closing said electronic switch when the signal from said selective circuit exceeds a predetermined level.

3. A receiver as claimed in claim 1, wherein said local carrier generator further comprises a frequency correction circuit coupled to said combination circuit.

4. A receiver as claimed in claim 3, wherein said local carrier generator comprises an oscillator having a frequency determining member and having two series of output pulses which are 180° out of phase, two electronic switches coupled respectively to the output means of said oscillator corresponding to the series of output pulses, two bistable triggers coupled respectively to said electronic switches, said bistable switches controlling said electronic switches, means to couple pulses from said combination circuit to set said bistable triggers, means to couple pulses from said oscillator to reset said bistable triggers, a divider coupled to said electronic switches, an integrating network in said frequency correction circuit, means to couple said combination circuit to said integrating network, and means to couple the output means from said integrating to said frequency determining member.

5. A receiver as claimed in claim 1, wherein each of the combination circuits of said first group comprises a selection gate which is coupled to a separate selection gate and means for coupling an output of one of the second group of signal channels to said separate selection gate, said coupled output of the second group of signal channels being in the phase sector corresponding to the combination circuit of said first group.

* * * * *